United States Patent [19]

Cadwell

[11] 3,740,958

[45] June 26, 1973

[54] METHOD OF FABRICATING AND INSTALLING A SUBMERGIBLE PIPELINE

[76] Inventor: Sidney M. Cadwell, 436 Washington Road, Grosse Pointe, Mich. 48236

[22] Filed: Jan. 19, 1971

[21] Appl. No.: 107,677

Related U.S. Application Data

[63] Continuation-in-part of Ser. No. 782,966, Dec. 11, 1968.

[52] U.S. Cl.................... 61/72.1, 61/72.2, 61/72.3, 156/195, 156/244
[51] Int. Cl...... F16l 1/00, B31c 13/00, B65h 37/00
[58] Field of Search.................. 61/72.3, 72.2, 72.1, 61/72.4; 138/145, 142; 156/195, 244

[56] References Cited
UNITED STATES PATENTS

| | | | |
|---|---|---|---|
| 3,487,648 | 1/1970 | Lawrence | 61/72.3 |
| 3,380,259 | 4/1968 | Rubenstein | 61/72.2 |
| 3,251,332 | 5/1966 | Vassar | 61/72.3 X |
| 2,718,684 | 9/1955 | Bjorsten | 61/72.2 X |
| 2,161,036 | 6/1939 | Gremmel et al. | 138/145 X |
| 2,605,202 | 7/1952 | Reynolds | 61/72.2 X |
| 3,132,416 | 5/1964 | Hait | 61/72.1 X |
| 3,376,180 | 4/1968 | Larson et al. | 156/195 |
| 3,414,448 | 12/1968 | Harpfer | 156/244 X |

Primary Examiner—Jacob Shapiro
Attorney—Harness, Dickey & Pierce

[57] ABSTRACT

This disclosure pertains to an improved method of continuously fabricating pipe for use in the transmission of fluids, or other flowable materials, between locations separated by an aqueous body, such as a shore location and an off-shore well. The method includes transporting the constituent materials for fabricating the pipeline on a pipe laying barge to the site wherefrom the pipeline is to be installed, and continuously fabricating the pipe on the barge while simultaneously installing the pipe on, or within, the bed of the body of water to the site whereto the pipeline is to connect. The pipe itself is comprised of a foundation tube of an oil and gas resistant polymer suitably strengthened by a selective number of additional layers of wire, cable, metallic strips or sheets, other polymeric layers, or a combination thereof, as is necessary to withstand both the internal stresses imposed by the transmitted fluid, and the external stresses imposed by the installation or laying technique and the under-water situs wherein the pipeline is to be located.

6 Claims, 8 Drawing Figures

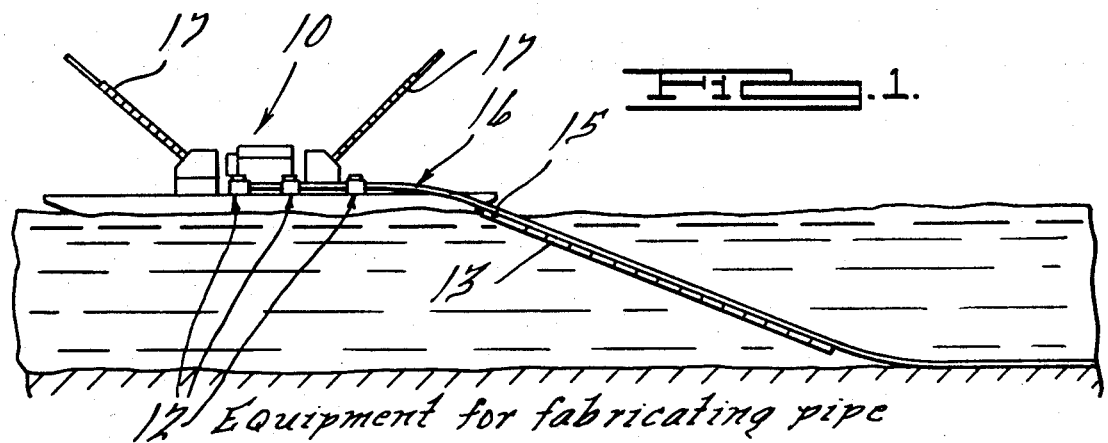
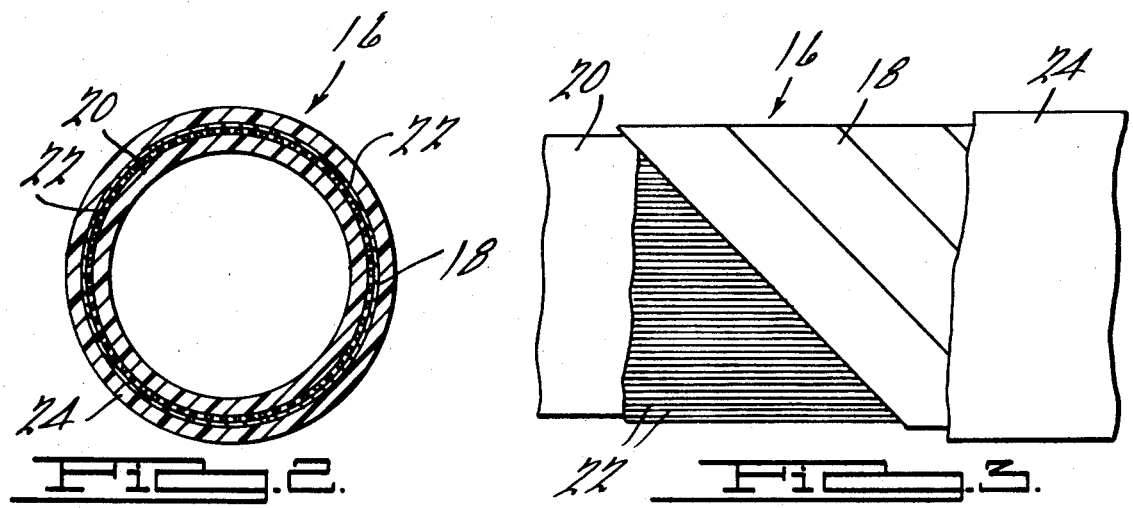
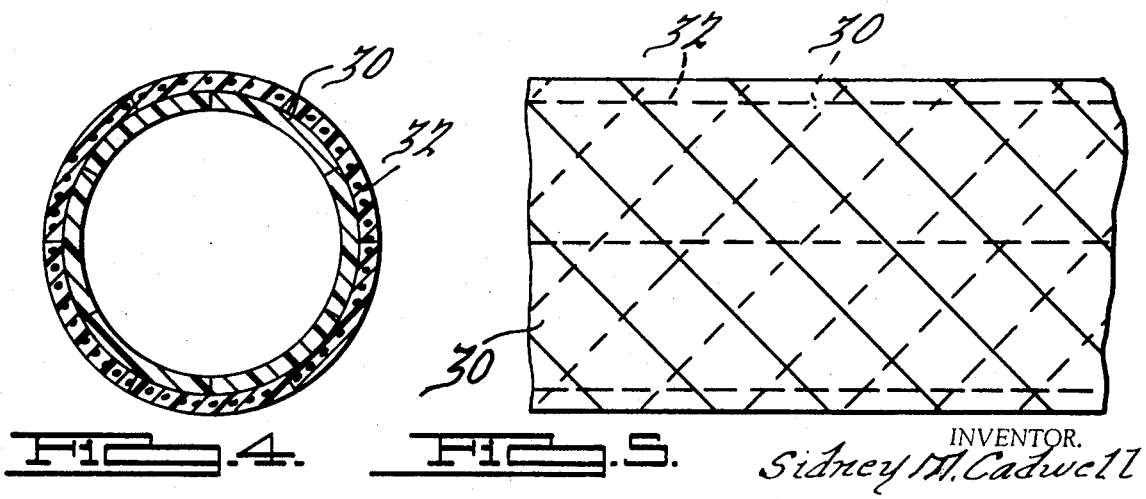

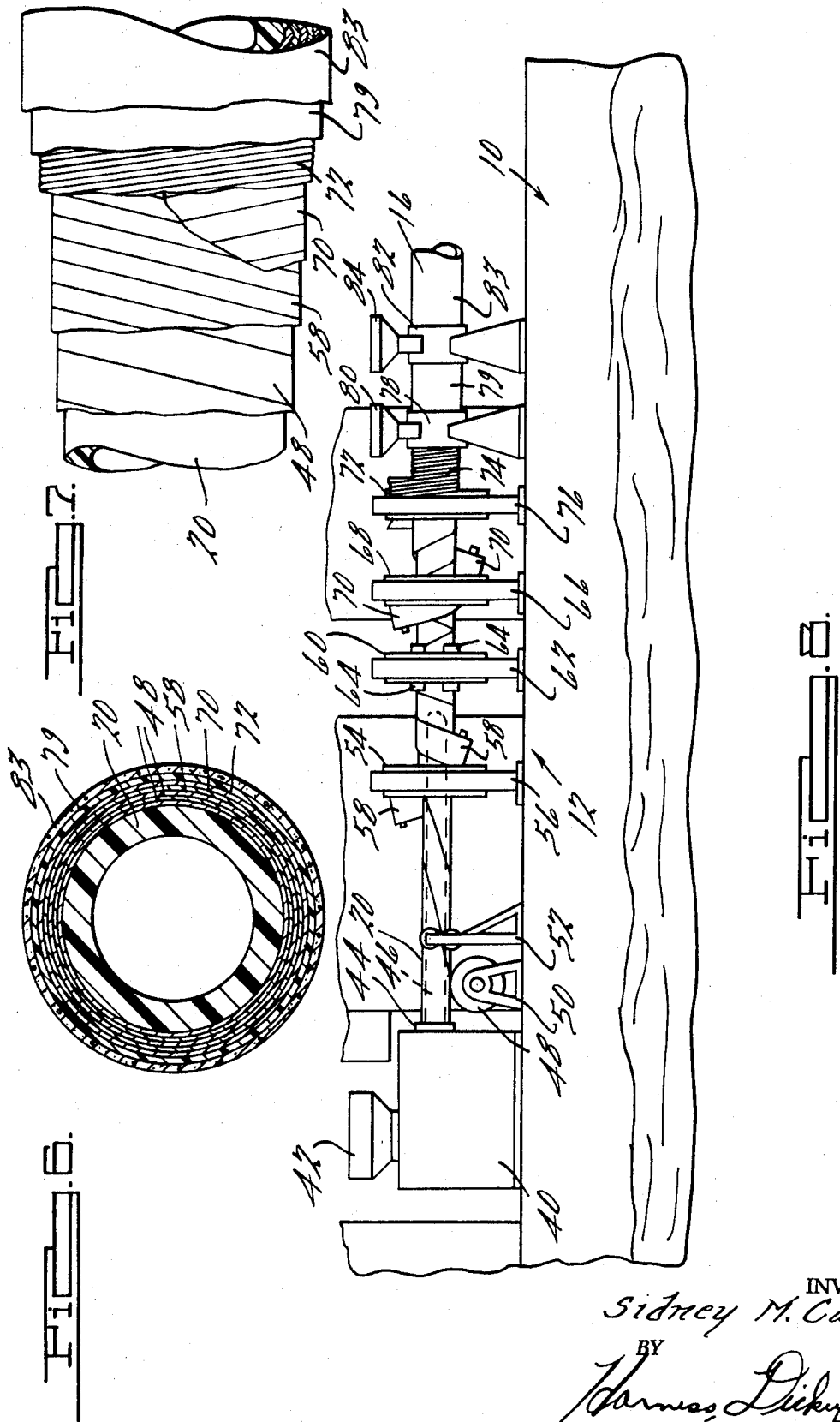

3,740,958

METHOD OF FABRICATING AND INSTALLING A SUBMERGIBLE PIPELINE

CROSS REFERENCE TO PRIOR APPLICATION

This application is a continuation-in-part of U.S. application, Ser. No. 782,966, filed Dec. 11, 1968, for: Method of Fabricating Pipe for Off-Shore Wells.

BACKGROUND AND SUMMARY OF THE INVENTION

In recent years, the discovery of oil, gas and other valuable materials under bodies of water has increased the use of off-shore drilling assemblies for removing these materials from beneath the water. Of course, it is necessary that the materials being extracted from the off-shore well be transported to a refining installation on shore. The transportation of these materials by ship has been found to be prohibitively expensive and time consuming. Accordingly, it has been the practice to lay pipes or tubes from the off-shore well to a point on shore, with the materials extracted from the drilling assembly being flowed through the pipeline by well pressure or auxiliary pumps or compressors.

The pipe itself must be designed from materials having no detrimental effect from oil, gas, or sea water, be leakproof so as not to endanger marine life and coastal property, and be sufficiently flexible to conform generally to the contour of the stinger during installation and thereafter to the contour of the bed under the body of water. Generally speaking, the pipe should have the capability of a working or operating pressure of around 1,500 psig which has been found to conform to well head pressures, and should be sufficiently weighted or secured to the bed to resist buoyant and undercurrent forces.

Traditionally, submergible pipelines are constructed in one of two methods. The first method encompasses connecting and winding short lengths of relatively small diameter pipe on a large spool or reel, and thereafter unreeling and laying the pipe to a submerged location.

The second method encompasses transporting 40 to 80-foot lengths of metal pipe, generally steel, on a laying barge to the site where the pipe is to be installed. These sections of metal pipe are then welded together on the laying barge and passed over the stern to a stinger assembly, the stinger assembly directing the pipe to the bottom of body of water. The pipe is generally retained at the bottom by having concrete weights applied thereto, or by being installed in a trench which is subsequently back-filled. As is obvious, the welding of the pipe is an extremely slow process and the installing progress of the barge has been found to be approximately one-half mile to one mile per day. For this reason and the need for retention to the bed, the cost of laying off-shore pipe exceeds the cost of laying on-shore pipe by approximately $15 to $20 a running foot. Further, the 40 to 80-foot lengths of prefabricated pipe are extremely heavy, cumbersome and require large spaces on the barge to store the pipe. In spite of these disadvantages, however, the second method is used almost exclusively with pipe having diameters of from 12 to 48 inch diameters.

In accordance with the features of the present invention, the constituent materials for fabricating the pipe or tube are collected on the laying barge and sufficient machinery is installed on the barge to permit the continuous and relatively rapid fabrication of the pipe or hose at the site of laying the hose or pipe. Thus, by utilizing oil and gas resisting polymers, in addition to strengthening materials, a highly satisfactory, economical and reliable pipe or hose may be fabricated for use in transporting materials from an off-shore well to an on-shore installation.

Accordingly, it is one object of the present invention to provide an improved method of installing pipe or hose to an off-shore drilling installation.

It is another object of the present invention to provide an improved method of transporting flowable materials from an off-shore well to an on-shore installation.

It is still a further object of the present invention to provide an improved method of fabricating pipe or hose for use in connection with an off-shore drilling installation.

It is another object of the present invention to provide a method of laying pipe to an off-shore well which is inexpensive to fabricate, easy to install and greatly increases the speed at which the pipe or hose can be installed.

It is still a further object of the present invention to provide an improved pipe or hose for off-shore drilling use.

Other advantages of the present invention will become apparent from a consideration of the following detailed description taken in conjunction with the accompanying drawings.

BRIEF DESCRIPTION OF THE DRAWINGS

FIG. 1 is an elevational view of a pipe laying barge having the necessary fabrication equipment thereon to manufacture the required pipe;

FIG. 2 is a cross-sectional view of a first preferred pipe assembly;

FIG. 3 is a side view of FIG. 2, partially broken away;

FIG. 4 is a cross-sectional view of a second preferred pipe assembly;

FIG. 5 is a side view of FIG. 4, with the addition of an outer layer identical to the inner layer, but oppositely spiralled;

FIG. 6 is a cross-sectional view of a third preferred embodiment;

FIG. 7 is a side view of FIG. 6, partially broken away; and

FIG. 8 is a schematic illustration of the apparatus or machinery for fabricating the embodiment of FIG. 6.

DETAILED DESCRIPTION OF THE PREFERRED EMBODIMENTS

With reference now to FIG. 1 of the drawings, a pipe laying barge is indicated generally at 10, being approximately several hundred feet in length and having a beam of around 50 feet. Various machinery and apparatus 12 for fabricating a pipe 16 are disposed on the deck of the laying barge 10, and one, or more, suitable cranes, or booms, 17 are provided to facilitate controlling the movement of the pipe 16, and also to move materials about the barge 10 for purposes which shall hereinafter become apparent.

The barge 10 further includes a suitable engine room for providing heat and power for the machinery and apparatus 12, and has the capability of discharging pipe 16 from the stern by means of a stinger assembly 13. The stinger assembly 13 is adapted to provide the necessary support for the pipe 16 without inflicting damage thereto, while the pipe is being directed to the bed therebeneath the aqueous body for installation, the stinger 13 being hinged at 15 to provide flexibility in supporting the pipe 16.

Preferably, the barge 10 is further supplemented by a system of tugs, or anchors, and winches for the purpose of affording guidance therewith, so that the barge 10 is directed along a preselected pipeline location at a suitable uniform speed in usual weather. In addition, various augmenting vessels may be required to keep the laying barge 10 adequately supplied in staples necessary to fabricate the pipe as well as sustaining the barge 10.

In general, it is believed that the cost and time of laying pipe or tubing for off-shore drilling uses may be greatly decreased by utilizing a system of fabricating the pipe or tubing at the site where it is to be utilized. Thus, the constituent materials which are to be utilized in fabricating the piping or tubing are collected on the laying barge 10 and the equipment for fabricating the piping or tubing 16 is also loaded onto the barge. The laying barge 10 then follows a route generally along the selected path which the pipe or tubing is to be laid, and while fabricating the piping or tubing 16, places the piping or tubing 16 on the floor of the ocean, the harbor, etc.

Several methods of fabricating the piping or tubing are contemplated and three general methods have been selected as being preferred for purposes of this disclosure. The first method involves the use of a laying barge (such as is shown as 10 in FIG. 1) which has been provided with machinery 12 which is capable of fabricating a tube 16 (FIG. 2), by extruding or wrapping material 18 about the exterior of a foundation cylindrical member 20 while simultaneously laying wires 22 or cables longitudinally in place around the periphery of the cylindrical member 20. In this particular method, a cylindrical member is formed as a tube element which is prefabricated on-shore by a method that is generally utilized in fabricating tubings. Specifically, an elastomer tube is formed of a sheet of calendered elastomeric material, the tube being formed by continuously vulcanizing the overlapped edges of the calendered sheet to form the tube of the desired diameter.

This foundation tube 20 is then transported to the laying barge, the tube being of sufficiently thin wall to be capable of being stored as a flat double layered sheet having integral edges. Thus, great quantities of tubing of this type may be stored in a relatively small space prior to use on the laying barge. In this way, the storage capabilities of the laying barge are not taxed to the limit. The thus preformed elastomer tube 20 is then fed through any known machine (such as 12, FIG. 1) which is capable of lining the exterior of the tube, after it has been rounded, with the necessary wires 22 and cables, positioned longitudinally for strengthening purposes, and further extruding or wrapping other strengthening and corrosion-resisting layers 24 on the exterior of the tube and wire or cable combination.

The features of the present invention are also illustrated in the second method which involves collecting the constituent materials for extruding the basic or foundation tube on the laying barge. Thus, the polymers necessary to form the foundation tube are collected on the barge and initially passed through an extruding machine (such as machine 12) to form a pipe or tube of the desired size. Subsequently, the strengthening materials discussed in conjunction with the first method are added, again by an extrusion or wrapping process.

The third preferred method involves continuously forming a final tube or pipe by wrapping reinforced or unreinforced prefabricated sheets 30 or ribbons of polymer on a mandrel of the proper size and subsequently adding strengthening structures 32 either by an extrusion or wrapping process or merely laying wires or cables longitudinally of the wrapped pipe or tube.

From the foregoing, it is to be noted that all of the materials collected on the laying barge may be easily stored and requires a minimum of storage space to accommodate the constituent materials prior to their use. The system of the present invention provides a capability of fabricating several miles of final piping or tubing which is capable of withstanding pressures and corrosive effects found in installations of this type. While certain of the materials may be more expensive than those presently being used, the savings and increase in the amount of finished tubing which may be installed in any one day greatly off-sets the additional cost of certain constituent materials. Of course, certain other materials may be purchased at a cheaper cost per pound than those presently being utilized in off-shore pipelines.

As to the materials to be utilized, there are many oil and gas resistant vulcanizable (elastomer) or unvulcanizable (plastic) polymers that may be utilized for pipe or tubing of the type described, either at an elevated or reduced temperature from the normal environment temperature. These oil and gas resistant vulcanizable elastomer materials which are preferably being utilized in the first and third methods disclosed above include acrylonitrile, epichlorhydrin, Hypalon, Thiokol or neoprene synthetic rubbers and polyepichlorhydrin plus polyethylene oxide blends, these latter blends being capable of remaining flexible at −40° F. The oil and gas resistant unvulcanizable plastics which are preferably utilized in conjunction with the second method described above include polyesters, polycarbonates, and ABS plastics made with methylacrylonitrile, these materials tending to withstand low temperatures. To resist diffusion of the oil or gas through the liner pipe, aluminum flake, or mica, is added to any of the polymeric materials utilized.

As is obvious, the amount of strengthening of the basic tube, in the case of the above described methods, that is necessary to overcome the pressures to which the tube will be subjected after it has been installed by the laying barge will depend on the constituent materials utilized in fabricating the pipe or tube and also the environment in which the tube is being installed. The strengthening can be increased or decreased in accordance with the particular requirements and may be added in the form of organic, or glass or steel weftless or woven filaments or cord or in the form of sheets or ribbons of metal or organic material which can be applied inside or outside the extruded or wrapped pipe or outside the prefabricated tube. As is stated above, the tubes and pipes must be protected against corrosion and be inert to the materials being passed through the tube and to the environment. Thus, internal and external coatings or layers of corrosion resistant and inert materials must be provided.

Also, wires and cables may be employed to confer sufficient strength to the final tube and may be applied in as many layers as are necessary to achieve the required strength. In this connection, in order to avoid shifting of the wires and cables, the wires and cables may be applied in groups formed of a plurality of wires or cables fastened together in side-by-side relationship to form a ribbon, the ribbon being held together by any suitable means. Also, the strengthening members, as for example the wires or cables, may be disposed longitudinally or may be wound spirally at whatever angle is desired and in any degree of thickness. Further, the wires or cables may be formed adjacent the inner diameter of the pipe or may be attached adjacent the outer diameter.

With reference now to FIGS. 2 and 3, a first preferred embodiment is fabricated by Method I by moving a prefabricated tube 20, which is approximately one-fourth inch thick and is formed of vulcanized oil resistant acrylonitrile elastomer, along a mandrel of the desired size as wires 22 or cables of steel approximately 0.1 inch in diameter are laid longitudinally along the surface to provide the necessary strength for the tube. The wires may be supplemented by cables disposed between the wires and similarly positioned longitudinally, the number of wires or cable being determined by the ultimate strength which is required of the final tube.

Further, ribbons of steel 18 which are 0.02 inch thick and 3 inches wide may be spirally wrapped on top of the wires and cables at any desired angle to provide radial strength. The angle of wrapping and the thickness of the steel determines the degree of radial strength. Obviously, several layers of combinations of wires and spirally wrapped ribbons may be provided to increase the strength of the ultimate tube. As stated above, the final product must be protected from corrosion and environmental damage. Accordingly, a quarter inch layer 24 of ABS plastic fabricated with methyl acrylonitrile is extruded over the outermost metal layer to provide the desired corrosion protection. After the fabrication of the pipe or hose is completed, the pipe or hose is cast over the stern of the laying barge 10 onto a stinger assembly 13 to be laid on the bottom of body of water, as is common in the art.

The first preferred embodiment may also be fabricated by the second method hereinbefore disclosed by extruding a foundation tube 20 of the desired diameter from ABS plastic made with methyl acrylonitrile. In the preferred embodiment, the wall thickness of the foundation tube will be approximately a quarter inch and of any desired diameter from approximately 12 inches to 32 inches. This tube is then fed onto a mandrel associated with suitable machinery for laying steel wires 22 approximately 0.1 inch in diameter longitudinally on the surface of the foundation tube 20 to provide the necessary longitudinal strength. As was stated above, the wires may be supplemented by cables and layers may be built up of wires or cables to achieve the desired strength.

As was the case with the first method, steel ribbons 18 approximately 0.02 inch thick and three inches wide may be wrapped spirally at any desired angle in thickness to yield the desired radial strength. Again, as was the case with the first method, approximately one-quarter inch of ABS plastic made from methyl acrylonitrile 24 is extruded over the outer metal layer to protect the complete assembly from corrosion, damage and wear. After the completion of the fabrication of the tube or pipe, the finished product is passed over the stern of the laying ship onto the stinger 13 and installed on the bottom of the body of water.

With reference now to FIGS. 4 and 5, a second preferred pipe embodiment is illustrated being fabricated by the third method hereinbefore described. This preferred embodiment does not involve the use of either a prefabricated foundation tube or a foundation tube which is manufactured at the site. Rather, the final tube or pipe is formed by spirally wrapping layers of elastomer material reinforced with steel wire of a dimension not visible in FIG. 4, the steel wire being embedded in the elastomer material, the layer assembly 30 being similar to that used in the manufacture of steel cord tires. A layer 32 is longitudinally placed on top of layer 30, the layer 32 being formed of strips of wires embedded in elastomer. The wires are seen to be longitudinally disposed relative to the axis of layer 30. FIG. 5 illustrates an additional layer 30 spiralled on top of layer 32 and oppositely spiralled relative to inner layer 30. Particularly, the laying barge is provided with a machine having a mandrel of the desired diameter on which is spiralled a layer of properly compounded acrylonitrile elastomer which is reinforced with a weftless steel wire layer, each of the layers being approximately 0.03 inch thick and 4 inches wide.

With regard to the materials being utilized in the vulcanization process, it has been previously discovered that a particular type of vulcanization proceeds at ordinary temperatures if four ingredients are present in appropriate amounts; namely, zinc oxide, sulfur, amine and carbon disulfide. If zinc oxide is incorporated into each complementary stock and sulfur is incorporated in only one of the complementary stocks, and zinc dimethyldithiocarbamate only in the other complementary stock, neither complementary stock will vulcanize at ordinary temperatures during the period when the two are separated, as for example, during the shipment or the like, because neither stock comprises the necessary four ingredients.

If, however, the two complementary stocks remain in contact for a sufficient period of time, the sulfur migrates into the stock containing the dithiocarbamate and the dithiocarbamate migrates into the stock containing the sulfur. Since the zinc dimethyldithiocarbamate comprises both amine and carbon disulfide, each stock will contain the necessary four ingredients after migration and vulcanization will proceed at ordinary temperatures. After migration is complete, each one hundred parts of elastomer should contain about ten parts of zinc oxide, 1.5 parts of sulfur and one part of zinc dimethyldithiocarbamate. Thus, the above constituent materials may be easily shipped without vulcanization and thereafter placed in contact for a sufficient period of time to affect vulcanization.

After the two layers of oppositely wrapped rubber on steel weftless wire are in place, the necessary number of steel wires of 0.1 inch in diameter are placed longitudinally on the surface to provide the necessary longitudinal strength. The wires may be supplemented by cables if necessary. After the wires and cables are in place, two more layers of properly compounded acrylonitrile elastomer, the elastomer being reinforced with weftless steel wire, are oppositely wrapped and are so positioned as to have complementary stock in contact, one with the other. Additional pairs of layers may be added if desired. It is to be noted that comparatively little equipment is required for the third method, this method comprising the wrapping process only.

With reference to FIGS. 6 and 7, a third preferred embodiment is illustrated constructed in accordance with either Method II or Method III. This embodiment is comprised of a foundation tube 20, which may be constructed by either an extrusion or wrapping process, and includes sufficient additional layers of relatively thin sheet metal, tensioning wires, and protective coatings as may be determined for strengthening thereof.

Preferably, the foundation tube 20 is extruded from an acrylonitrile elastomer, resistant to oil and gas, compounded with suitable vulcanizing agents and aluminum flake or mica. Other polymeric materials suitable for use in extruding the foundation tube include Hypalon, Thiokol, polyepichlorhydrin, neoprene synthetic rubbers, or polyepichlorhydrin plus polyethylene oxide blends, the latter being capable of remaining flexible at minus 40° F. Also various unvulcanizable oil and gas resistant plastics are suitable which include polyesters, polycarbomates and ABS plastics made with methylacrylonitrile. These materials tend to withstand low temperatures. All of the polymeric materials used should, however, contain aluminum flake or mica to resist diffusion of the gas or oil transmitted therethrough the completed pipeline 16.

In FIG. 8, the apparatus and machinery 12 is schematically illustrated for fabricating the third preferred embodiment, and it will be appreciated that the apparatus 12 hereinafter described is subject to modification of fabricating either of the first or second preferred embodiments. In accordance therewith Method II, which in this instance is preferred, a suitable extrusion machine 40 is disposed at the left or forward end of the apparatus 12 and includes a hopper 42, an extrusion head 44, and a mandrel 46 operatively projecting rearwardly therefrom the extrusion head 44, and defining the inner die for extruding the foundation tube 20. The extruding machine 40 forms no part of the present invention and may be of any conventional arrangement known in the art capable of continuously extruding pipe or tube on a mandrel. The mandrel 46 has an outside diameter corresponding to the desired inside diameter of the pipe 16 to be extruded, and the polymeric material for fabricating the foundation tube 20 is sufficiently heated on standard rubber mills (not shown) prior to being fed into the hopper 42. The extrusion head 44 is sized to provide a wall thickness to the foundation tube 20 of approximately one-fourth inch and the polymeric material is preferably, subsequently treated with an adhesive for attachment thereto of subsequent layers of material, and not to the mandrel, as shall be apparent as this specification proceeds.

The foundation tube 20 alternatively may be constructed in accordance with Method III. For accomplishment therewith, the extrusion machine 40 is removed and a mandrel, suitably supported by a standard is substituted. The mandrel for accomplishing this method is considerably elongated over the mandrel 46 and projects a sufficient distance forwardly to afford sufficient periphery thereon to continuously wrap strips of vulcanizable or unvulcanizable polymer, containing aluminum flake or mica, spirally with sufficient overlap until a continuous one-fourth inch layer is formed.

While the above contemplates the use of a strip of material having a thickness of less than one-fourth inch, it will be appreciated that the foundation tube could also be fabricated from one-fourth inch calendered stock. By this variation, the calendered stock is spirally fed onto the mandrel and rolled with or without vulcanization to form a lap splice of adequate width. Unless the lap splice is 360°, however, the resulting tube will be slightly out of round which may be alleviated by beveling the edge surfaces prior to feeding thereon the mandrel.

Either of Methods II or III are calculated to provide a foundation tube 20 adapted for subsequent strengthening. It will be appreciated, however, that Method II, due to the use of an extruding machine 40, is considerably heavier and more expensive than the wrapping apparatus of Method III. Method II, however, is preferred in that it yields a continuous, seamless, foundation structure 20 which is an advantage over a generally less continuous wrap. After fabrication of the foundation tube 20, the remaining strengthening steps are identical for either Method II or III.

As best observed in FIG. 8, a roll of sheet metal material 48, having a thickness of approximately 0.01 inch, is rotatably mounted on a frame 50. The sheet metal material 48 is preferably steel, although other materials may be substituted which have a comparable spring resistant quality and are adaptable to be wrapped on itself to form a wide overlap. The outward end of the roll of sheet metal 48 is directed rearward and upwardly through a pair of tensioning rollers 52 into contact helically with the foundation tube 20, supported interiorly by the mandrel 46. For attaching therewith, the sheet metal 48 is brushed or sprayed on both sides with an oil resistant, quick setting adhesive. Preferably, the overlap of the strip of sheet metal 48 is 360° so that there are two 0.01 inch layers of metal liners 48 held together by the adhesive. To quicken the setting rate of the adhesive, heat may be applied to the laminated structure thus formed, or a time interval may be introduced into the process if deemed convenient.

In any event, the foundation tube 20 with two layers of continuous adhesive treated metal 48 is motivated to the right or rearwardly on the barge 10. At such time as the roll of sheet metal 48 is nearly exhausted, which is contemplated to occur at distances of a mile or more, sheet metal from a second roll is attached to the outer peripheral surface of the sheet metal from the first roll to afford for some distance on overlap of two successive liners until the first roll is exhausted. The method described is adapted to minimize any change of leakage therefrom the laminated structure, and affords a suitable means of retaining continuity thereof the layers 48. The second roll is preferably rotatably supported on a second frame (not shown) disposed under, or adjacent, to the frame 50 and is transferred to the frame 50 upon exhaustion of the roll 48. As previously described, an adhesive is also brushed or sprayed to both inner and outer surfaces thereof the second roll.

As the barge 10, and correspondingly the apparatus and machinery 12, is advanced forwardly to the left, the foundation tube 20 wrapped and attached therewith the sheet metal layers 48, will be stripped from the mandrel 46 and be motivated rearwardly. Further, as observed in FIG. 1, the ultimate pipe will be subjected to various bending stresses prior to placement on, or in, the bed therebeneath the water. As will be appreciated, both the foundation tube 20 and the sheet metal wrapping are ideally adapted to flex, or bend, due to the laminated construction thereof. Further due to the preferred double wrapping of the sheet metal 48, the chance of having an edge of the sheet metal 48 cut the foundation tube 20 is greatly diminished due to the additional rigidity of two-ply metal.

With reference again to FIG. 8, and continuing with the construction of the third preferred embodiment, the foundation tube 20, wrapped with sheet metal 48, moves rearwardly to the right through a second wrapping means comprised of a rotary frame 54 mounted for rotation in an upright frame 56, which is suitably attached to the barge 10. The rotary frame 54 is adapted to rotate about a horizontal axis coincident with the horizontal axis of the mandrel 46, and includes a plurality of rolls of sheet metal 58, or any desired wrapping, rotatably connected thereto. Preferably, the rolls 58 are arranged with their axis at an angle with the horizontal axis of the mandrel 46 so that the strip metal, or wrapping material, will be wrapped immediately therearound the outer periphery of the sheet metal two-ply wrapped foundation tube 20, to form helically wound layers of material with their edges preferably in abutting relationship. As in the initial wrapping process, the strip metal material, or wrapping, from the rolls 58 should be brushed or sprayed on both sides with an oil resistant, quick setting adhesive prior to making contact with the previously fabricated pipe structure. Also means for driving the rotatable frame 54 is provided and adapted to control the rotation thereof in coordinated timed relationship with the linear velocity of the barge 10 and the radial speed of the mandrel 46.

Adjacent and rearwardly of the frame 56, the pipe structure enters a second rotating frame 60 rotatably supported therein an upright frame 62, which is also secured to the barge 10. The frames 60 and 62 are similar in all respects to the frames 54 and 56 respectively, and include a plurality of shoes 64 or the like. The shoes 64 have an inner surface which conforms to the outside diameter of the pipe structure thus formed, and are employed to smooth or "iron" the wrappings. In addition, if desired, heat and pressure may be applied to the shoes 64 for the purpose of setting the adhesive.

Following the step performed by the shoes 64, the pipe structure is caused to pass through a frame 66 supporting an additional rotatable frame 68 identical in all respects to the frames 56 and 54, respectively, and further including a plurality of rolls of additional wrap 70 generally identical to the rolls 58. Preferably, the frame 68 is adapted to rotate in a direction opposite to the direction of rotation of the frame 54 to thus apply its wrapping helically on the pipe, but extending in the opposite direction from the wrappings of the plurality of rolls 58. As with the material from the rolls 58, both sides of the material is brushed or sprayed with oil resistant, quick setting adhesive before it makes contact with the structure hereinbefore fabricated. In this manner, successive oppositely directed layers of material are applied to enable any desired thickness and strength to be achieved. With respect to the end of the material from the rolls 70, due to the multiplicity thereof, the particular strips do not have to be attached to the end of any succeeding strip as the adhesive suffices to hold the strip in place.

Should additional strength be required, the pipe structure may be further wrapped by tensional strands applied by an additional rotatable frame 72 carrying a plurality of strand material 74. In this instance, the rotatable frame 72 is rotatably supported by stationary frame 76 suitably affixed to the barge 10, and is similar to the previous described frames 68 and 66, 60 and 62, and 54 and 56. The strand material 74 is preferably wire or any other filamenting material capable of being tensioned for the purpose of resisting internal pressure in the pipe when the latter is put to use. If additional longitudinal strength is deemed appropriate, various deviations in the angle of the wrapping may be applied therewith. Alternatively, the longitudinal strength may be supplemented by longitudinal strands, such as wires or cables, held in place singly, or in groups, by frames of the nature hereinbefore described, having a plurality of rolls of strands attached thereto.

Following the application of the wire, a filamentary material 74, an additional coating of protective or insulating material, such as ABS plastic, may be applied, by passing the pipe structure through an extruding head 78 whereto the extrusion material is supplied from a hopper 80. Should the thickness of this coating be relatively thin, as is obvious, it could be applied by means of a spray or brush process.

If it is further desired to afford a second extruded layer, such as an exterior coating of cementitious material to add weight thereto, this could be accomplished by a second extruding head 82 wherein the material is supplied from a hopper 84. The cementitious material may be a stiff, quick setting mix of Portland Cement, with or without a mineral aggregate, and in this instance should Portland Cement be selected, it should be appropriately wrapped with a layer of cheese cloth to prevent the aqueous body from washing it thereaway. The cheese cloth could be applied from an additional rotatable frame supported by a suitable structural frame (not shown).

In accordance with the present invention, the strands 74 could be constructed from various glass fabrics if the internal stresses of the pipe could be satisfactorily resisted. Also, the structure of the pipeline itself could be varied along its length when different conditions are encountered. The number of layers of metal, stocks, or stiffening materials can be increased when greater mechanical strength is required, and conversely may be reduced for transmitting fluids under less pressure. Likewise, more protective coatings or heavier coatings could be applied as required.

For connecting the above described reinforced pipe to the off-shore well or on-shore location, each end of the polymeric laminated pipe, and the pressure vessel to which it is to connect, may be wrapped sufficiently by hand with metal ribbon, wire, or the like, and for a sufficient distance to withstand and contain the internal pressure therein.

It is to be noted that substantially more than a mile of steel ribbon or rubberized weftless steel wire may be shipped on one reel. Further, the quarter inch thick wall elastomer tube of Method III may be shipped flat, as described above, so that a pile of tubing fifty feet long and ten feet wide would consist of approximately two miles of continuous tube. Thus substantially one to two miles of continuous pipe may be fabricated with the system of the present invention.

It is to be noted further that the material to be extruded by Method II may be delivered to the laying barge already mixed and having an elevated temperature so that it is ready for the extrusion process. Further, the rolls of reinforced elastomer stock may be kept from sticking together in ways already known to the trade and the elastomer stock may be tackified before fabrication by methods also known in the trade.

With the features of the present invention, pipes or hose made up of comparatively thin ribbons or wires of metal are able to withstand the sharp bends while entering or leaving the stinger.

While it will be apparent that the preferred embodiments, illustrated herein, are well calculated to fulfill the objects above stated, it will be appreciated that the invention is susceptible to modification, variation, and change without departing from the proper scope or fair meaning of the subjoined claims. For example, the wires and cables described hereinbefore for the first and second preferred embodiments, as being longitudinally disposed relative to the foundation tube, may be spirally wrapped around the foundation tube. Also, to preclude collapse of the final tube assembly as it is being installed on the ocean floor, the interior of the tube may be pressurized for the period between installation of the tube and pumping of the flowable materials through the tube.

What is claimed is:

1. A method of laying a submergible pipeline between first and second locations separated by an aqueous body comprising the steps of: congregating the constituent materials for the pipe on a pipe laying barge having a stinger assembly, said materials being nonself-supporting, continuous, and substantially weldless; positioning said pipe laying barge on the aqueous body at the first location; fabricating a self-supporting pipe or he like on the barge by assembling said constituent materials into a substantially continuous seamless tube; said fabricating step including providing a relatively thin walled continuous flexible foundation tube and installing support members on the exterior surface of said foundation tube; applying a continuous outer protective coating around said seamless tube; and simultaneously laying said pipe from said barge to the second location; said laying step including at least partially supporting said tube in the aqueous body between the barge and the bed thereof, said support members including wires or the like disposed longitudinally on said flexible tube and applying containing means around said wires or the like, said containing means including strips of metallic material spirally wound on the exterior of said wires, said fabricating step further including the step of providing an exterior coating around the exterior of said strips, said exterior coating being extruded after said strips are wound.

2. A method of laying a submergible pipeline between first and second locations separated by an aqueous body comprising the steps of: congregating the constituent materials for the pipe on a pipe laying barge having a stinger assembly, said materials being nonself-supporting, continuous, and substantially weldless; positioning said pipe laying barge on the aqueous body at the first location; fabricating a self-supporting pipe or the like on the barge by assembling said constituent materials into a substantially continuous seamless tube; said fabricating step including providing a relatively thin walled continuous flexible foundation tube and installing support members on the exterior surface of said foundation tube; applying a continuous outer protective coating around said seamless tube; and simultaneously laying said pipe from said barge to the second location; said laying step including at least partially supporting said tube in the aqueous body between the barge and the bed thereof, said fabricating step further including extruding the thin walled flexible tube on the barge.

3. A method of laying a submergible pipeline between first and second locations separated by an aqueous body comprising the steps of: congregating the constituent materials for the pipe on a pipe laying barge having a stinger assembly, said materials being nonself-supporting, continuous, and substantially weldless; positioning said pipe laying barge on the aqueous body at the first location; fabricating a self-supporting pipe or the like on the barge by assembling said constituent materials into a substantially continuous seamless tube; said fabricating step including providing a relatively thin walled continuous flexible foundation tube and installing support members on the exterior surface of said foundation tube; applying a continuous outer protective coating around said seamless tube; and simultaneously laying said pipe from said barge to the second location; said laying step including at least partially supporting said tube in the aqueous body between the barge and the bed thereof, said fabricating step including providing first strips of vulcanizable material, providing second strips of reinforced vulcanizable material, spiralling said first strips on a mandrel in a first direction, spiralling said second strips on said first strips in a second direction opposite to said first direction, said first and second spiralled strips forming the pipe or the like, and vulcanizing said strips.

4. A method of fabricating and laying submergible pipe on the bed of an aqueous body from a pipe laying barge comprising the steps of: positioning the barge on the aqueous body; congregating the constituent materials for the fabrication of pipe on the barge; fabricating a substantially continuous foundation tube of polymeric material; strengthening said foundation tube by adding additional metallic layers on said foundation tube; applying a corrosive resistant coating around said metallic layers; and directing the laminated pipe to the bed of the aqueous body, said directing step including supporting said pipe in the aqueous body from a first location proximate to said barge to a second location beneath the surface of the aqueous body, said strengthening step including adhesively wrapping a sheet of metallic material helically around the outer peripheral surface of said foundation tube.

5. The method of claim 4 wherein said strengthening step further includes spirally wrapping additional strips of metallic material around said sheet of metallic material.

6. The method of claim 4 wherein said strengthening step includes wrapping tensioning strands spirally around said sheet of metallic material.

* * * * *